United States Patent Office 3,076,803
Patented Feb. 5, 1963

3,076,803
4-HALO-Δ³,⁵-PREGNADIENE DERIVATIVES AND PROCESS THEREFOR
John A. Zderic, Palo Alto, Calif., Otto Halpern, Mexico City, Mexico, and Jose Iriarte, Zurich, Switzerland, assignors, by mesne assignments, to Syntex Corporation, a corporation of Panama
No Drawing. Filed Feb. 26, 1962, Ser. 175,809
22 Claims. (Cl. 260—239.55)

The present invention relates to novel cyclopentanophenanthrene derivatives and to a process for the production thereof.

More particularly the present invention relates to novel 4-fluoro and chloro-Δ³,⁵-pregnadiene derivatives.

The novel compounds of the present invention which are progestational agents with anti-estrogenic, anti-gonadotrophic and anti-ovulatory properties are represented by the following formula:

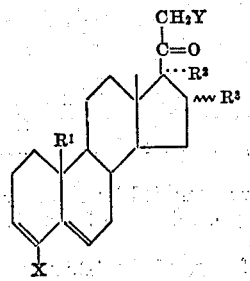

In the above formula Y represents hydrogen or fluorine; X represents fluorine or chlorine; R¹ represents hydrogen or methyl; R² represents hydrogen, hydroxyl or a hydrocarbon carboxylic acyloxy group of less than 12 carbon atoms; R³ represents hydrogen, α-methyl, β-methyl, α-hydroxy or α-acyloxy; in addition R² and R³ together may represent the group:

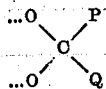

wherein P may be a lower alkyl group and Q represents a lower alkyl, or an aryl or aralkyl group, each containing up to 8 carbon atoms.

The acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

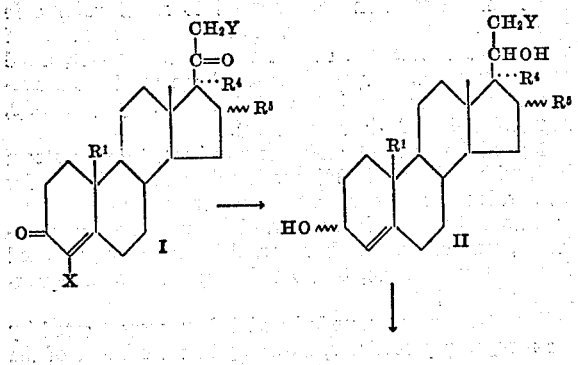

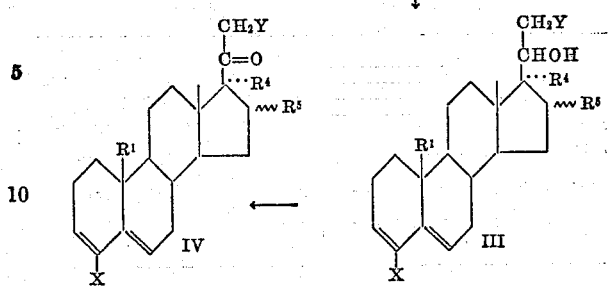

In the above formulas Y, X, and R¹ have the same meaning as previously set forth, R⁴ may be hydrogen or a hydrocarbon carboxylic acyloxy group of less than 12 carbon atoms; R⁵ represents hydrogen, α-methyl, β-methyl or α-acyloxy; in addition R⁴ and R⁵ together may represent the group

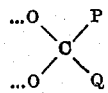

wherein P and Q have the same meaning as hereinbefore described.

In practicing the process outlined above, the starting compound, which is a 4-fluoro or chloro-Δ⁴-pregnen-3,20 dione derivative (I) is reduced with a double metal hydride, preferably sodium borohydride to give the corresponding 3β,20β-diol and the 3α-isomer thereof (II). Reaction of this mixture in an acid medium, preferably 50% acetic acid, at steam bath temperature, for a period of time of the order of 1 hour, affords the corresponding 4-fluoro or chloro-Δ³,⁵-pregnadien-20β-ol (III). Oxidation of this latter compound, preferably with chromium trioxide in pyridine, yields the corresponding 4-fluoro or chloro-Δ³,⁵-pregnadien-20-one (IV).

The compounds obtained by the above described procedures, which have a 17α-acyloxy group present in the molecule, yield the corresponding 17α-free hydroxyl derivative by conventional saponification, preferably with an alkali metal hydroxide.

The final compounds of the present invention having a ketonide at the 16,17-positions produce the 16α,17α-diols by hydrolysis with a strong acid, preferably formic acid. The free alcohols thus obtained, are conventionally acylated with an excess of an acylating agent, as for example an anhydride derived from a hydrocarbon carboxylic acid of the type described hereinbefore in the presence of p-toluenesulfonic acid, thus affording correspondingly the 17α-monoacylates or the 16α,17α-diacylates. The latter compounds, upon selective saponification in a mild alkaline medium yield the corresponding 16α-hydroxy-17α-acyloxy derivative which by further acylation gives the respective 16,17-diester with the same or different ester groups.

Alternatively, conventional acylation of the 16α,17α-diol in the absence of p-toluenesulfonic acid yields the corresponding 16α-acyloxy-17α-hydroxy compound which upon further acylation in the presence of p-toluenesulfonic acid with the same or a different acylating agent gives the corresponding 16,17-diester with the same or different ester groups.

The following specific examples serve to illustrate but are not intended to limit the scope of the present invention:

Preparation 1

Progesterone was treated with isocyanuric chloride, following the procedure described by F. Mukawa, Bull. Chem. Soc. Japan 33, 25 (1960), yielding 4-chloro-progesterone.

By the same procedure there were treated the starting compounds listed below, thus affording the corresponding products:

| Starting compound | Product |
| --- | --- |
| 19-nor-progesterone | 4-chloro-19-nor-progesterone. |
| 17α-acetoxy-progesterone | 4-chloro-17α-acetoxy-progesterone. |
| 16α-methyl-progesterone | 4-chloro-16α-methyl-progesterone. |
| 16β-methyl-progesterone | 4-chloro-16β-methyl-progesterone. |
| 16α-methyl-17α-acetoxy-progesterone. | 4-chloro-16α-methyl-17α-acetoxy-progesterone. |
| 21-fluoro-17α-acetoxy-progesterone. | 4-chloro-21-fluoro-17α-acetoxy-progesterone. |
| 16α,17α-dihydroxy-progesterone-acetonide. | 4-chloro-16α,17α-dihydroxy-progesterone-acetonide. |
| 16α,17α-dihydroxy-progesterone-acetophenonide. | 4-chloro-16α,17α-dihydroxy-progesterone-acetophenonide. |

*Preparation 2*

A solution of 5 g. of progesterone in 350 cc. of methanol was treated while stirring with 20 cc. of a 4 N aqueous solution of sodium hydroxide and 20 cc. of 30% hydrogen peroxide, keeping the temperature at approximately 15° C. The solution was left at 0° C. overnight, then poured into ice water. The formed precipitate was filtered, washed with water and dried. Recrystallization from acetone-hexane gave 4α,5α-oxido-progesterone.

To a solution of 5 g. of the foregoing oxide in 250 cc. of ether and 250 cc. of benzene were added 5 cc. of freshly distilled boron trifluoride etherate. The reaction mixture was left at room temperature overnight. After addition of water, the organic layer was separated, washed with water, dried over anhydrous sodium sulfate and evaporated under reduced pressure. The residue was dissolved in 120 cc. of acetone and mixed with 2 cc. of concentrated hydrochloric acid. The mixture was kept for 4 hours at room temperature and then poured into water. The product was filtered, dried under vacuum and crystallized from acetone-hexane, thus giving 4-fluoro-progesterone.

Following the same procedures there were treated the starting compounds listed below thus yielding first the corresponding 4α,5α-oxido derivatives and thereafter the corresponding products hereinafter set forth.

| Starting compound | Product |
| --- | --- |
| 19-nor-progesterone | 4-fluoro-19-nor-progesterone. |
| 17α-acetoxy-progesterone | 4-fluoro-17α-acetoxy-progesterone. |
| 16α-methyl-progesterone | 4-fluoro-16α-methyl-progesterone. |
| 16β-methyl-progesterone | 4-fluoro-16β-methyl-progesterone. |
| 16α-methyl-17α-acetoxy-progesterone. | 4-fluoro-16α-methyl-17α-acetoxy-progesterone. |
| 21-fluoro-17α-acetoxy-progesterone. | 4-fluoro-21-fluoro-17α-acetoxy-progesterone. |
| 16α,17α-dihydroxy-progesterone acetonide. | 4-fluoro-16α,17α-dihydroxy-progesterone acetonide. |
| 16α,17α-dihydroxy-progesterone-acetophenonide. | 4-fluoro-16α,17α-dihydroxy-progesterone-acetophenonide. |

*Preparation 3*

A cooled solution of 4 g. of 4-chloro-progesterone in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the crude 4-chloro-21-iodo-progesterone. The crude product was dried in vacuum, dissolved in 20 cc. of acetonitrile and treated dropwise with 1.4 g. of silver fluoride dissolved in 3 cc. of water. After a short time, silver iodide started to separate leaving the 21-fluoro-pregnan derivative in solution. The mixture was kept for 24 hours at room temperature and filtered. Concentration of the filtrate under vacuum gave a crude product which after crystallization from methanol-acetone yielded 4-chloro-21-fluoro-progesterone.

When applying the same procedure to 4-fluoro-progesterone, 4-chloro-19-nor-progesterone, 4-fluoro-19-nor-progesterone and 4-chloro-16α-methyl-progesterone there were respectively produced 4,21-difluoro-progesterone, 4-chloro-21-fluoro-19-nor-progesterone, 4,21 - difluoro - 19-nor-progesterone and 4-chloro-21-fluoro-16α-methyl-progesterone.

*Preparation 4*

A culture of *Streptomyces roseochromogenus* ATCC 3347 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup, the mixtures were then incubated in a shaking machine at 28° C., under aeration for a period of 24–48 hours. There was thus obtained a vegetating growing culture of *Streptomyces roseochromogenus* which was used for the subsequent incubation of the steroid.

10 mg. of 4-chloro-21-fluoro-progesterone were added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving 4-chloro-21-fluoro-16α-hydroxy-progesterone.

A mixture of 1 g. of the latter compound, 4 cc. of pyridine and 2 cc. of acetic anhydride was kept at room temperature overnight, poured into ice water, the formed precipitate was filtered, washed with water and dried. Crystallization from acetone-hexane gave 4-chloro-21-fluoro-16α-acetoxy-progesterone.

Following the same procedures, the compounds under I were first transformed into the corresponding 16α-hydroxy derivatives and thereafter, into the products under II.

| I | II |
| --- | --- |
| 4,21-difluoro-progesterone | 4,21-difluoro-16α-acetoxy-progesterone. |
| 4-chloro-21-fluoro-19-nor-progesterone | 4-chloro-21-fluoro-16α-acetoxy-19-nor-progesterone. |
| 4,21-difluoro-19-nor-progesterone | 4,21-difluoro-16α-acetoxy-19-nor-progesterone. |
| 4-chloro-19-nor-progesterone | 4-chloro-16α-acetoxy-19-nor-progesterone. |
| 4-fluoro-19-nor-progesterone | 4-fluoro-16α-acetoxy-19-nor-progesterone. |

EXAMPLE I

A solution of 2 g. of sodium borohydride in 30 cc. of methanol was added with stirring to a solution of 2 g. of 4-chloro-progesterone in 40 cc. of tetrahydrofuran. The mixture was kept at room temperature for 8 hours, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave a mixture of 4-chloro-$\Delta^4$-pregnene-3β, 20β-diol and the 3α-isomer thereof.

1 g. of the foregoing mixture was heated on the steam bath with 100 cc. of 50% acetic acid under nitrogen for 1 hour, it was then concentrated under vacuum to a small volume and poured into water. The precipitate was collected, washed well with water, dried and recrystallized from acetone-hexane, thus furnishing 4-chloro-$\Delta^{3,5}$-pregnadien-20β-ol.

The starting compounds listed below, were treated by the foregoing procedures, affording first a mixture of the corresponding 3β,20β-diols and 3α-isomers thereof, and then the respective products hereinafter disclosed.

| Starting compounds | Products |
| --- | --- |
| 4-chloro-19-nor-progesterone | 4-chloro-19-nor-$\Delta^{3,5}$-pregnadien-20β-ol. |
| 4-chloro-17α-acetoxy-progesterone | 4-chloro-17α-acetoxy-$\Delta^{3,5}$-pregnadien-20β-ol. |
| 4-chloro-16α-methyl-progesterone | 4-chloro-16α-methyl-$\Delta^{3,5}$-pregnadien-20β-ol. |
| 4-chloro-16β-methyl-progesterone | 4-chloro-16β-methyl-$\Delta^{3,5}$-pregnadien-20β-ol. |
| 4-chloro-16α-methyl-17α-acetoxy-progesterone. | 4-chloro-16α-methyl-17α-acetoxy-$\Delta^{3,5}$-pregnadien-20β-ol. |
| 4-chloro-21-fluoro-17α-acetoxy-progesterone. | 4-chloro-21-fluoro-17α-acetoxy-$\Delta^{3,5}$-pregnadien-20β-ol. |
| 4-chloro-16α,17α-dihydroxy-progesterone-acetonide. | 4-chloro-$\Delta^{3,5}$-pregnadiene-16α,17α,20β-triol-16,17-acetonide. |
| 4-chloro-16α,17α-dihydroxy-progesterone-acetophenonide. | 4-chloro-$\Delta^{3,5}$-pregnadiene-16α,17α,20β-triol-16,17-acetophenonide. |
| 4-fluoro-19-nor-progesterone | 4-fluoro-19-nor-$\Delta^{3,5}$-pregnadien-20β-ol. |
| 4-fluoro-17α-acetoxy-progesterone | 4-fluoro-17α-acetoxy-$\Delta^{3,5}$-pregnadien-20β-ol. |
| 4-fluoro-16α-methyl-progesterone | 4-fluoro-16α-methyl-$\Delta^{3,5}$-pregnadien-20β-ol. |
| 4-fluoro-16β-methyl-progesterone | 4-fluoro-16β-methyl-$\Delta^{3,5}$-pregnadien-20β-ol. |
| 4-fluoro-16α-methyl-17α-acetoxy-progesterone. | 4-fluoro-16α-methyl-17α-acetoxy-$\Delta^{3,5}$-pregnadien-20β-ol. |
| 4-fluoro-21-fluoro-17α-acetoxy-progesterone. | 4,21-difluoro-17α-acetoxy-$\Delta^{3,5}$-pregnadien-20β-ol. |
| 4-fluoro-16α,17α-dihydroxy-progesterone acetonide. | 4-fluoro-$\Delta^{3,5}$-pregnadiene-16α,17α,20β-triol-16,17-acetonide. |
| 4-fluoro-16α,17α-dihydroxy-progesterone-acetophenonide. | 4-fluoro-$\Delta^{3,5}$-pregnadiene-16α,17α,20β-triol-16,17-acetophenonide. |
| 4-fluoro-progesterone | 4-fluoro-$\Delta^{3,5}$-pregnadien-20β-ol. |

EXAMPLE II

A solution of 6 g. of 4-chloro-$\Delta^{3,5}$-pregnadien-20β-ol obtained in accordance with Example I, in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 4-chloro-$\Delta^{3,5}$-pregnadien-20-one.

Following the above method there were treated the starting compounds listed below, thus yielding the corresponding products hereinafter disclosed.

| Starting compounds | Products |
| --- | --- |
| 4-chloro-19-nor-$\Delta^{3,5}$-pregnadien-20β-ol. | 4-chloro-19-nor-$\Delta^{3,5}$-pregnadien-20-one. |
| 4-chloro-17α-acetoxy-$\Delta^{3,5}$-pregnadien-20β-ol. | 4-chloro-17α-acetoxy-$\Delta^{3,5}$-pregnadien-20-one. |
| 4-chloro-16α-methyl-$\Delta^{3,5}$-pregnadien-20β-ol. | 4-chloro-16α-methyl-$\Delta^{3,5}$-pregnadien-20-one. |
| 4-chloro-16β-methyl-$\Delta^{3,5}$-pregnadien-20β-ol. | 4-chloro-16β-methyl-$\Delta^{3,5}$-pregnadien-20-one. |
| 4-chloro-16α-methyl-17α-acetoxy-$\Delta^{3,5}$-pregnadien-20β-ol. | 4-chloro-16α-methyl-17α-acetoxy-$\Delta^{3,5}$-pregnadien-20-one. |
| 4-chloro-21-fluoro-17α-acetoxy-$\Delta^{3,5}$-pregnadien-20β-ol. | 4-chloro-21-fluoro-17α-acetoxy-$\Delta^{3,5}$-pregnadien-20-one. |
| 4-chloro-$\Delta^{3,5}$-pregnadiene-16α,17α,20β-triol-16,17-acetonide. | 4-chloro-$\Delta^{3,5}$-pregnadiene-16α,17α-diol-20-one-16,17-acetonide. |
| 4-chloro-$\Delta^{3,5}$-pregnadiene-16α,17α-diol-20-one-16,17-acetophenonide. | 4-chloro-$\Delta^{3,5}$-pregnadiene-16α,17α-diol-20-one-16,17-acetophenonide. |
| 4-fluoro-19-nor-$\Delta^{3,5}$-pregnadien-20β-ol. | 4-fluoro-19-nor-$\Delta^{3,5}$-pregnadien-20-one. |
| 4-fluoro-17α-acetoxy-$\Delta^{3,5}$-pregnadien-20β-ol. | 4-fluoro-17α-acetoxy-$\Delta^{3,5}$-pregnadien-20-one. |
| 4-fluoro-16α-methyl-$\Delta^{3,5}$-pregnadien-20β-ol. | 4-fluoro-16α-methyl-$\Delta^{3,5}$-pregnadien-20-one. |
| 4-fluoro-16β-methyl-$\Delta^{3,5}$-pregnadien-20β-ol. | 4-fluoro-16β-methyl-$\Delta^{3,5}$-pregnadien-20-one. |
| 4-fluoro-16α-methyl-17α-acetoxy-$\Delta^{3,5}$-pregnadien-20β-ol. | 4-fluoro-16α-methyl-17α-acetoxy-$\Delta^{3,5}$-pregnadien-20-one. |
| 4,21-difluoro-17α-acetoxy-$\Delta^{3,5}$-pregnadien-20β-ol. | 4,21-difluoro-17α-acetoxy-$\Delta^{3,5}$-pregnadien-20-one. |
| 4-fluoro-$\Delta^{3,5}$-pregnadiene-16α,17α,20β-triol-16,17-acetonide. | 4-fluoro-$\Delta^{3,5}$-pregnadiene-16α,17α-diol-20-one-16,17-acetonide. |
| 4-fluoro-$\Delta^{3,5}$-pregnadiene-16α,17α,20β-triol-16,17-acetophenonide. | 4-fluoro-$\Delta^{3,5}$-pregnadiene-16α,17α-diol-20-one-16,17-acetophenonide. |
| 4-fluoro-$\Delta^{3,5}$-pregnadien-20β-ol | 4-fluoro-$\Delta^{3,5}$-pregnadien-20-one. |

EXAMPLE III

A solution of 0.17 g. of potassium hydroxide in 0.2 cc. of water and 2.5 cc. of methanol was added over 30 minutes to a boiling solution of 1 g. of 4-chloro-17α-acetoxy-$\Delta^{3,5}$-pregnadien-20-one in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 4-chloro-$\Delta^{3,5}$-pregnadien-17α-ol-20-one.

Following the same technique there were treated 4-chloro-16α-methyl-17α-acetoxy-$\Delta^{3,5}$-pregnadien-20-one, 4-fluoro-17α-acetoxy-$\Delta^{3,5}$-pregnadien-20-one, and 4-fluoro-16α-methyl-17α-acetoxy-$\Delta^{3,5}$-pregnadien-20-one thus giving correspondingly 4-chloro-16α-methyl-$\Delta^{3,5}$-pregnadien-17α-ol-20-one, 4-fluoro-$\Delta^{3,5}$-pregnadien-17α-ol-20-one and 4-fluoro-16α-methyl-$\Delta^{3,5}$-pregnadien-17α-ol-20-one.

EXAMPLE IV

To a solution of 5 g. of 4-chloro-$\Delta^{3,5}$-pregnadien-17α-ol-20-one, obtained according to the preceding example, in 100 cc. of anhydrous benzene there were added 1 g. of p-toluene sulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 4-chloro-$\Delta^{3,5}$-pregnadien-17α-ol-20-one-caproate.

By the above procedure there were treated 4-chloro-16α-methyl-$\Delta^{3,5}$-pregnadien-17α-ol-20-one, 4-fluoro-$\Delta^{3,5}$-pregnadien-17α-ol-20-one and 4-fluoro-16α-methyl-$\Delta^{3,5}$-pregnadien-17α-ol-20-one giving correspondingly 4-chloro-16α-methyl-$\Delta^{3,5}$-pregnadien-17α-ol-20-one-caproate, 4-fluoro-$\Delta^{3,5}$-pregnadien-17α-ol-20-one-caproate and 4-fluoro-16α-methyl-$\Delta^{3,5}$-pregnadien-17α-ol-20-one-caproate.

EXAMPLE V 1 g. of 4-chloro-$\Delta^{3,5}$-pregnadiene-16α,17α-diol-20-one-16,17-acetonide was heated on the steam bath with 20 cc. of 60% formic acid for 1 hour, cooled, diluted with water and the precipitate was collected, washed with water, dried, and recrystallized from acetone-hexane, thus affording 4-chloro-$\Delta^{3,5}$-pregnadiene-16α,17α-diol-20-one.

Following the same procedure there was treated 4-fluoro-$\Delta^{3,5}$-pregnadiene-16α,17α-diol-20-one-16,17-acetophenonide to form 4-fluoro-$\Delta^{3,5}$-pregnadiene-16α,17α-diol-20-one.

EXAMPLE VI 4-chloro-$\Delta^{3,5}$-pregnadiene-16α,17α-diol-20-one and 4-fluoro-$\Delta^{3,5}$-pregnadiene-16α,17α-diol-20-one were acylated following the procedure described in Example IV affording respectively 4-chloro-$\Delta^{3,5}$-pregnadiene-16α,17α-diol-20-one-16,17-dicaproate and 4-fluoro-$\Delta^{3,5}$-pregnadiene-16α,17α-diol-20-one-16,17-dicaproate.

EXAMPLE VII 2 g. of 4-chloro-$\Delta^{3,5}$-pregnadien-16α,17α-diol-20-one-16,17-dicaproate dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 4-chloro-$\Delta^{3,5}$-pregnadien-16α,17α-diol-20-one-17-caproate.

EXAMPLE VIII

A mixture of 1 g. of the foregoing compound, 4 cc. of pyridine and 2 cc. of propionic anhydride was kept at room temperature overnight, poured into ice water, the formed precipitate was filtered, washed with water and dried. Crystallization from acetone-hexane gave 4-chloro- $\Delta^{3,5}$-pregnadien-16α,17α-diol-20-one-16-propionate-17-caproate.

EXAMPLE IX 4-fluoro-$\Delta^{3,5}$-pregnadiene-16α,17α-diol-20-one was treated, following the technique described in the foregoing example, thus furnishing 4-fluoro-$\Delta^{3,5}$-pregnadiene-16α,17α-diol-20-one-16-propionate.

EXAMPLE X

The foregoing compound was treated following the procedure described in Example IV, except that caproic anhydride was substituted by cyclopentylpropionic anhydride thus yielding 4-fluoro-$\Delta^{3,5}$-pregnadiene-16α,17α-diol-20-one-16-propionate-17-cyclopentylpropionate.

EXAMPLE XI 4-chloro-21-fluoro-17α-acetoxy-$\Delta^{3,5}$-pregnadien-20-one and 4,21-difluoro-17α-acetoxy-$\Delta^{3,5}$-pregnadien-20-one were treated following the procedure described in Example III, yielding respectively 4-chloro-21-fluoro-$\Delta^{3,5}$-pregnadien-17α-ol-20-one and 4,21-difluoro-$\Delta^{3,5}$-pregnadien-17α-ol-20-one.

EXAMPLE XII 4-chloro-21-fluoro-progesterone was successively treated in accordance with Examples I and II, yielding respectively 4-chloro-21-fluoro-$\Delta^{3,5}$-pregnadien-20β-ol and 4-chloro-21-fluoro-$\Delta^{3,5}$-pregnadien-20-one.

EXAMPLE XIII 4,21-difluoro-progesterone was consecutively treated according to Examples I and II, furnishing correspondingly 4,21-difluoro-$\Delta^{3,5}$-pregnadien-20β-ol and 4,21-difluoro-$\Delta^{3,5}$-pregnadien-20-one.

EXAMPLE XIV 4-chloro-21-fluoro-19-nor-progesterone was successively treated following the procedures described in Examples I and II, giving respectively 4-chloro-21-fluoro-19-nor-$\Delta^{3,5}$-pregnadien-20β-ol and 4-chloro-21-fluoro-19-nor-$\Delta^{3,5}$-pregnadien-20-one.

EXAMPLE XV 4,21-difluoro-19-nor-progesterone was successively treated by the procedures of Examples I and II, thus affording respectively 4,21-difluoro-19-nor-$\Delta^{3,5}$-pregnadien-20β-ol and 4,21-difluoro-19-nor-$\Delta^{3,5}$-pregnadiene-20-one.

EXAMPLE XVI 4-chloro-21-fluoro-16α-methyl-progesterone was successively treated in accordance with Examples I and II, to produce respectively 4-chloro-21-fluoro-16α-methyl-$\Delta^{3,5}$-pregnadien-20β-ol and 4-chloro-21-fluoro-16α-methyl-$\Delta^{3,5}$-pregnadien-20-one.

EXAMPLE XVII 4,21-difluoro-16α-acetoxy-progesterone, 4-chloro-21-fluoro-16α-acetoxy-19-nor-progesterone, 4,21-difluoro-16α-acetoxy-19-nor-progesterone, 4-chloro-16α-acetoxy-19-nor-progesterone and 4-fluoro-16α-acetoxy-19-nor-progesterone were treated in accordance with Example I, to produce respectively 4,21-difluoro-16α-acetoxy-$\Delta^{3,5}$-pregnadien-20β-ol, 4-chloro-21-fluoro-16α-acetoxy-19-nor-$\Delta^{3,5}$-pregnadien-20β-ol, 4,21-difluoro-16α-acetoxy-19-nor-$\Delta^{3,5}$-pregnadien-20β-ol, 4-chloro-16α-acetoxy-19-nor-$\Delta^{3,5}$-pregnadien-20β-ol and 4-fluoro-16α-acetoxy-19-nor-$\Delta^{3,5}$-pregnadien-20β-ol.

EXAMPLE XVIII

The final products of the preceding example were treated according to Example II, yielding respectively 4,21-difluoro-16α-acetoxy-$\Delta^{3,5}$-pregnadien-20-one, 4-chloro-21-fluoro-16α-acetoxy-19-nor-$\Delta^{3,5}$-pregnadien-20-one, 4,21-difluoro-16α-acetoxy-19-nor-$\Delta^{3,5}$-pregnadien-20-one, 4-chloro-16α-acetoxy-19-nor-$\Delta^{3,5}$-pregnadien-20-one and 4-fluoro-16α-acetoxy-19-nor-$\Delta^{3,5}$-pregnadien-20-one.

EXAMPLE XIX

The final products of the preceding example were treated in accordance with Example III, thus affording respectively 4,21-difluoro-$\Delta^{3,5}$-pregnadien-16α-ol-20-one, 4-chloro-21-fluoro-19-nor-$\Delta^{3,5}$-pregnadien-16α-ol-20-one, 4,21-difluoro-19-nor-$\Delta^{3,5}$-pregnadien-16α-ol-20-one, 4-chloro-19-nor-$\Delta^{3,5}$-pregnadien-16α-ol-20-one and 4-fluoro-19-nor-$\Delta^{3,5}$-pregnadien-16α-ol-20-one.

We claim:
1. A compound of the following formula:

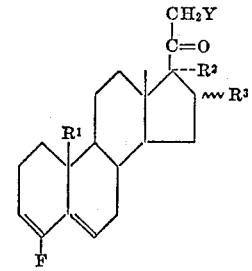

wherein Y is selected from the group consisting of hydrogen and fluorine; $R^1$ is a member of the group consisting of hydrogen and methyl; $R^2$ is selected from the group consisting of hydrogen, hydroxyl and a hydrocarbon carboxylic acyloxy group of less than 12 carbon atoms; $R^3$ is a member of the group consisting of hydrogen, α-methyl, β-methyl, α-hydroxyl and an α-hydrocarbon carboxylic acyl group of less than 12 carbon atoms, $R^2$ and $R^3$ together are in addition, the group

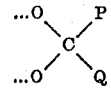

wherein P is a lower alkyl group and Q is selected from the group consisting of a lower alkyl, an aryl and an aralkyl group, each containing up to 8 carbon atoms.

2. A compound of the following formula:

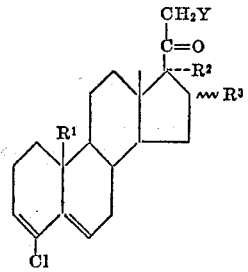

wherein Y is selected from the group consisting of hydrogen and fluorine; $R^1$ is a member of the group consisting of hydrogen and methyl; $R^2$ is selected from the group consisting of hydrogen, hydroxyl and a hydrocarbon carboxylic acyloxy group of less than 12 carbon atoms; $R^3$ is a member of the group consisting of hydrogen, α-methyl, β-methyl, α-hydroxyl and an α-hydrocarbon carboxylic acyl group of less than 12 carbon atoms; $R^2$ and $R^3$ together are in addition, the group

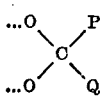

wherein P is a lower alkyl group and Q is selected from the group consisting of a lower alkyl, an aryl and an aralkyl group, each containing up to 8 carbon atoms.

3. 4-chloro-$\Delta^{3,5}$-pregnadien-20-one.
4. 4-chloro-19-nor-$\Delta^{3,5}$-pregnadien-20-one.
5. 4-chloro-17α-acetoxy-$\Delta^{3,5}$-pregnadien-20-one.
6. 4-chloro-16α-methyl-$\Delta^{3,5}$-pregnadien-20-one.
7. 4-chloro-16β-methyl-$\Delta^{3,5}$-pregnadien-20-one.
8. 4-chloro-16α-methyl-17α-acetoxy-$\Delta^{3,5}$-pregnadien-20-one.

9. 4-chloro-21-fluoro-17α-acetoxy-$\Delta^{3,5}$-pregnadien-20-one.

10. 4-chloro-$\Delta^{3,5}$-pregnadiene-16α,17α-diol-20-one-16,17-acetonide.

11. 4-chloro-$\Delta^{3,5}$-pregnadiene-16α,17α-diol-20-one-16,17-acetophenonide.

12. 4-fluoro-$\Delta^{3,5}$-pregnadien-20-one.

13. 4-fluoro-19-nor-$\Delta^{3,5}$-pregnadien-20-one.

14. 4-fluoro-17α-acetoxy-$\Delta^{3,5}$-pregnadien-20-one.

15. 4-fluoro-16α-methyl-$\Delta^{3,5}$-pregnadien-20-one.

16. 4-fluoro-16β-methyl-$\Delta^{3,5}$-pregnadien-20-one.

17. 4-fluoro-16α-methyl-17α-acetoxy-$\Delta^{3,5}$-pregnadien-20-one.

18. 4-fluoro-21-fluoro-17α-acetoxy-$\Delta^{3,5}$-pregnadien-20-one.

19. 4-fluoro-$\Delta^{3,5}$-pregnadiene-16α,17α-diol-20-one-16,17-acetonide.

20. 4-fluoro-$\Delta^{3,5}$-pregnadiene-16α,17α-diol-20-one-16,17-acetophenonide.

21. A process for the production of a compound selected from the group consisting of 4-fluoro-$\Delta^{3,5}$-pregnadiene and 4-chloro-$\Delta^{3,5}$-pregnadiene derivatives which comprises treating the corresponding 4-halo-$\Delta^4$-pregnen-3-one with a double metal hydride, and reacting the resulting mixture of 3α and 3β hydroxy derivatives with an acid.

22. The process of claim 21 wherein the double metal hydride is sodium borohydride and the acid is 50% acetic acid.

No references cited.